(12) United States Patent
Cobb, Jr.

(10) Patent No.: US 10,536,992 B2
(45) Date of Patent: Jan. 14, 2020

(54) RESISTANCE METHOD

(71) Applicant: John Arthur Cobb, Jr., Greensboro, NC (US)

(72) Inventor: John Arthur Cobb, Jr., Greensboro, NC (US)

( * ) Notice: Subject to any disclaimer, the term of this patent is extended or adjusted under 35 U.S.C. 154(b) by 168 days.

(21) Appl. No.: 15/291,093

(22) Filed: Oct. 12, 2016

(65) Prior Publication Data

US 2018/0100242 A1   Apr. 12, 2018

(51) Int. Cl.
| | | |
|---|---|---|
| *H05B 3/00* | (2006.01) | |
| *H05B 7/18* | (2006.01) | |
| *B01J 19/08* | (2006.01) | |
| *C25B 1/04* | (2006.01) | |
| *C25B 15/02* | (2006.01) | |
| *F24H 1/00* | (2006.01) | |

(52) U.S. Cl.
CPC .......... *H05B 3/0004* (2013.01); *B01J 19/088* (2013.01); *C25B 1/04* (2013.01); *C25B 15/02* (2013.01); *F24H 1/0018* (2013.01); *H05B 7/18* (2013.01); *F24H 2250/02* (2013.01)

(58) Field of Classification Search
CPC ...... H05B 3/03; H05B 3/0004; H05B 3/0009; H05B 3/0019; H05B 3/0023; H05B 3/023; H05B 7/18; F24H 1/0018; B01J 19/087; B01J 19/088
See application file for complete search history.

(56) References Cited

U.S. PATENT DOCUMENTS

| | | | | |
|---|---|---|---|---|
| 1,525,998 A | * | 2/1925 | Kaelin | F22B 1/30 |
| | | | | 392/328 |
| 4,343,987 A | * | 8/1982 | Schimbke | F22B 1/30 |
| | | | | 122/382 |

(Continued)

OTHER PUBLICATIONS

"Electrical Resistance and conductance" https://web.archive.org/web/20150619094424/https://en.wikipedia.org/wiki/Electrical_resistance_and_conductance (Year: 2015).*

(Continued)

*Primary Examiner* — Nicholas A Smith
(74) *Attorney, Agent, or Firm* — Tuggle Duggins P.A.; Blake P. Hurt

(57) ABSTRACT

The resistance method is a process for conditioning of an electric current and subjecting it to manipulated resistance levels to cause an effect on a substance as the current passes through. The method has two basic functions. One is to condition the electric current. This takes place during the series of steps that manipulate the frequency, voltage, and amps to provide a combination suitable for a predetermined threshold or action. The other is to manipulate the resistance of a substance. This is done by manipulating the atmospheric pressure, pH, salinity, and temperature of the substance, all of which takes place in a reactor. The reactor provides an isolated, enclosed environment for the manipulation to take place. The method also utilizes an electronic control system. The electronic control system simultaneously measures and manipulates the variables of the process, thereby creating an environment within the reactor that either increases or decreases the amount of resistance to which the electric current is subjected.

13 Claims, 5 Drawing Sheets

(56) References Cited

U.S. PATENT DOCUMENTS

| | | | | |
|---|---|---|---|---|
| 6,018,471 A * | 1/2000 | Titus | .................. | A62D 3/19 |
| | | | | 363/126 |
| 6,187,154 B1 | 2/2001 | Yamaguchi et al. | | |
| 8,308,917 B2 * | 11/2012 | Hinatsu | .................. | C25B 1/00 |
| | | | | 204/256 |
| 8,419,922 B2 * | 4/2013 | Grimes | .................. | B01J 3/04 |
| | | | | 205/637 |
| 8,961,747 B2 * | 2/2015 | Kurashina | ............... | C25B 15/02 |
| | | | | 204/228.5 |
| 9,034,167 B2 * | 5/2015 | Finfrock | ................. | C25B 1/04 |
| | | | | 205/628 |
| 2006/0042251 A1 | 3/2006 | Villalobos | | |
| 2006/0060464 A1 | 3/2006 | Chang | | |
| 2014/0326681 A1 | 11/2014 | Denvir et al. | | |

OTHER PUBLICATIONS

One page International Search Report dated May 14, 2018 for PCT/US2017/000099.

* cited by examiner

RESISTANCE METHOD

FIELD OF THE INVENTION

The invention herein pertains to electrical conditioning devices and methods, and particularly pertains to a method of conditioning the current and manipulating the resistance levels of an electrical current to achieve a desired result, including increasing the resistance in a closed system to create hot water or steam and decreasing the resistance in the same system to achieve a higher level of conductivity

DESCRIPTION OF THE PRIOR ART AND OBJECTIVES OF THE INVENTION

Electrical resistance produces heat when electrical current passes through a solution or substance. By conditioning the electrical current and manipulating the resistance levels of a solution or substance and/or the electrical current, a method can be generated to achieve a desired result. These results can vary from increasing the resistance the electrical current encounters to create hot water or steam to decreasing the resistance to promote a higher level of conductivity as defined by the substance. In the case of higher resistance, the electrical current produces heat to create hot water or steam in a closed system when the substance is water. By comparison, lower resistance may be advantageous to promote a substance or solution that has a higher level of electrical conductivity.

While the general electrical principles of resistance, conductivity, and heat production are known in the art, there has heretofore never been an articulated method of manipulating the factors than impact the resistance impacting an electrical current, and specifically, no such method has been utilized with the intent to do work, for example the creating of hot water or steam within a closed system.

Thus, in view of the problems and disadvantages associated with prior art devices, the present invention was conceived and one of its objectives is to provide a reactor and a computer system to make steam which can be used to do work, for example for use in a generator for power generation.

It is another objective of the present invention to provide a reactor and a computer system to produce hot water.

It is still another objective of the present invention to provide a reactor and a computer system configured to change the resistance defined by a substance or solution, for example to increase the electrical conductivity of water within the reactor.

It is yet another objective of the present invention to provide a reactor and a computer system configured to change the resistance defined by a substance or solution, for example to lower the electrical conductivity of water within the reactor.

It is a further objective of the present invention to provide a method of manipulating the resistance of a given substance or solution with a resistance system and method, the system comprising a reactor, a portion of wiring, an electronic control system, a solution pump, a circulation pump, and a float switch.

It is still a further objective of the present invention to provide a method of manipulating the resistance of a given substance or solution with a resistance system and method, the method manipulating at least one of the salinity, temperature, pressure, and pH of the reaction substance or solution.

It is yet a further objective of the present invention to provide a method of manipulating the resistance of a given substance or solution with a resistance system and method, the method manipulating at least one of the voltage, amperage, and frequency of the electrical current introduced to the system.

It is a further objective of the present invention to provide a computer system configured to alternately increase or decrease the resistance and conductivity of a solution or substance.

Various other objectives and advantages of the present invention will become apparent to those skilled in the art as a more detailed description is set forth below.

SUMMARY OF THE INVENTION

The aforesaid and other objectives are realized by providing a system and method of manipulating the resistance of a given substance or solution as experienced by an electrical current with a resistance system and method with the goal of harvesting the results of the higher or lower electrical resistance. The method includes wiring one or more insulated hydrolysis reactors together in series, each reactor including a cathode and anode oriented to produce a spark gap. A computer control system monitors variables such as temperature, reactor pressure, salinity, and current amperage, and further includes output accessories to alter these variables as may be desirable. By increasing or decreasing the electrical resistance encountered by the electrical current within the reactor, increased resistance within the reactor substance (typically water) may be heated and even produce steam, which in turn can be harvested to do work. If resistance is lowered, the electrical current may pass more efficiently through the reactor substance or solution, creating a higher level of conductivity. The steps of the instant method are designed to increase the overall efficiency of the aforementioned process.

DETAILED DESCRIPTION OF THE PREFERRED EMBODIMENT AND OPERATION OF THE INVENTION

Figure 1:
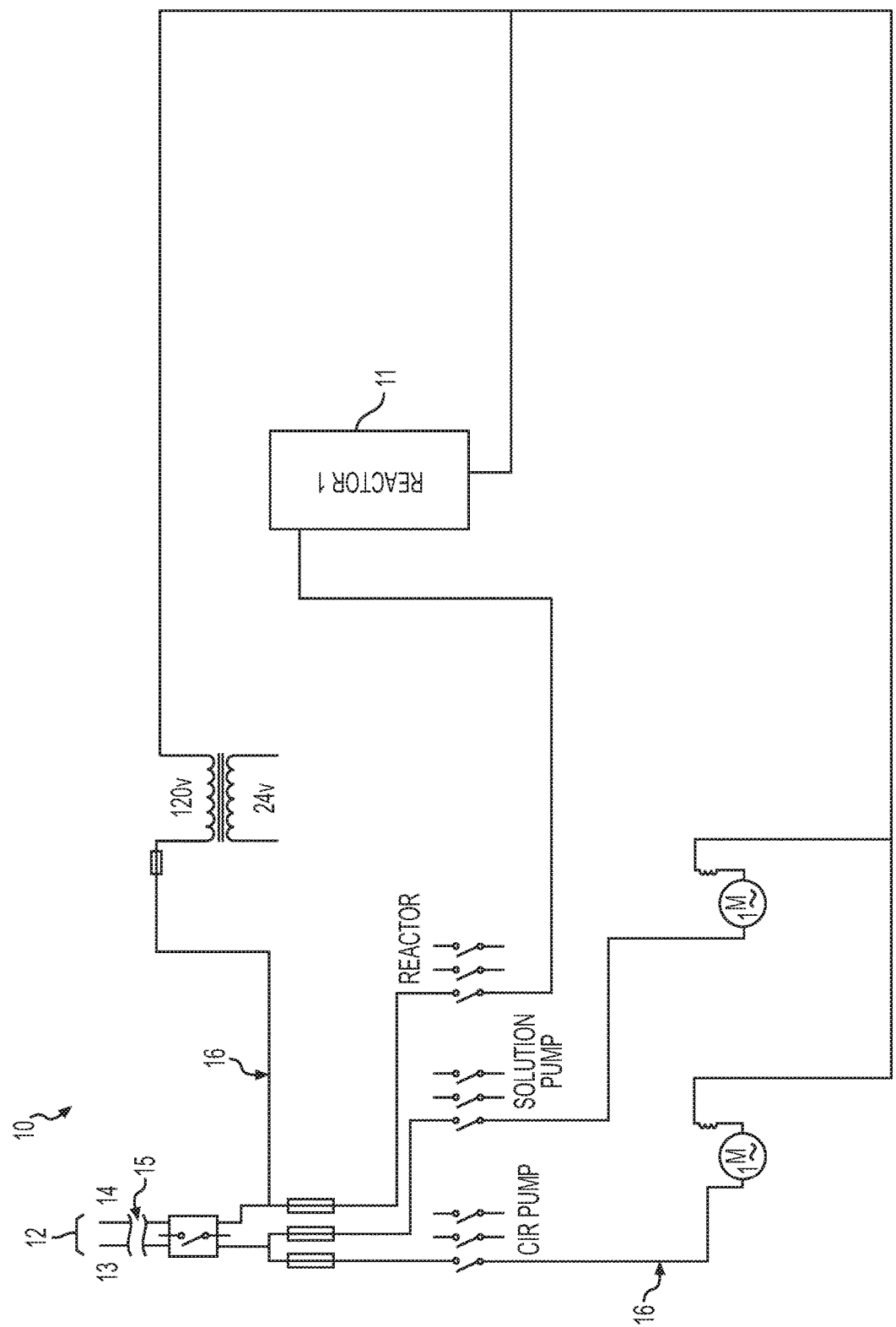
FIG. 1 is a schematic illustration of the wiring of a single reactor.

For a better understanding of the invention and its operation, turning now to the drawings, preferred resistance system 10 includes one or more reactor(s) 11 each including at least two electrodes 12, at least one of the electrodes 12 defined as cathode 13 and at least one of electrodes 12 defined as anode 14. The number of placement of electrodes 12 is not intended to be construed as a limitation on the present invention, as a range of electrode number and placement are within the scope of the instant disclosure, so long as the selected number and placement utilize spark gapping to aid in the manipulation of voltage and frequency to desired levels as it travels through the solution or substance. The size and shape of reactor(s) 11 are not intended as a limitation on the instant disclosure, as any geometry that retains substance or solution 15 in a closed or substantially closed system and that can modify the resistance experienced by the electrical current produced at electrodes 12. In the preferred embodiment, species of reactor 11 are insulated (not shown) to prevent the loss of electrical current, for example in the form of loss of voltage of the electrical current or heat. Without insulation, reactor 11 may be unable to withstand the changes as to temperature and pressure imparted on the interior of reactor 11 according to aspects of the instant method. With respect to the orientation and configuration of reactor 11, preferred electrodes 12 are positioned such that one or more cathode 13 and one or more anode 14 define a gap therebetween. The gap defined by the one or more cathode 13 and one or more anode 14 is operantly filled with substance or solution material 15, in the preferred embodiment defined as water, in order to facilitate a gapping suitable to produce a spark (sometimes referred to as "spark gapping"). Spark gapping (or a "spark gap") is an arrangement of two conducting electrodes such as electrodes 12 separated by a gap that is filled with a medium such as substance or solution 15 designed to allow an electric spark to form and subsequently pass between the respective electrodes. This happens when the voltage difference exceeds the breakdown voltage of the substance or solution 15. The use of spark gapping is part of the conditioning of the electric current to achieve higher electrical transfer efficiencies.

In one embodiment, a single reactor 11 may be used in resistance system 10, which relies on a plurality of wires 16 wired as illustrated in FIG. 1. The current enters reactor 11 at anode 14 and leaves reactor 11 at cathode 13, which in this embodiment is defined as a neutral. In an illustrative example, consider reactor 11 receiving 25 amps: in order to add one or more additional reactors 11, an additional 25 amps per reactor 11 will be necessary to produce the same output. Therefore, the wiring configuration in FIG. 1 is less preferred. The preferred wiring configuration is demonstrated in FIG. 2, in which current enters reactor 11 at anode 14 and leaves at cathode 13, similar to FIG. 1. However, instead of exiting via a neutral, cathode 13 is attached to another reactor 11 via the associated anode 14 (a wiring configuration known as "in series"). As the electrical current passes through the first reactor 11, voltage is lost due to the resistance encountered as defined by substance or solution 15. One embodiment of system 10 may include an external capacitor or any other members to manipulate the voltage as may be desirable. The wiring of the reactor(s) 11 assist in the conditioning of the electric current to subject it to the desired resistance levels to effect the substance or solution 15 as the current passes through part of the conditioning of the electric current to be applied to a substance or solution. In addition, operating multiple reactors 11 at the cost of the same twenty five amps adds in the overall efficiency to the process described herein.

A control system 17 is utilized to modify or vary the resistance of a given substance or solution 15 with the instant resistance system 10 and associated method. In the preferred embodiment, control system 17 is defined as a computer program, computer hardware, and/or peripherals to simultaneously measure and manipulate the variables of the instant process. For example a programmable logic controller (PLC) can be used to receive information including (but not limited to) temperature, reactor pressure, salinity, and current amperage from one or more sensors configured to detect the same (not shown). This information may be used to determine which step of the method is better applied to achieve a specific result, for example to boil water 15 to create steam. Control system 17 defines a range of adjustable variables that may be modified depending on the desires of the user and the specific nature of the resistance method as dictated not only by the system 10, but also by the specific parameters to be achieved. By modifying some, all, or other of the variables described above, the computer program, hardware, and/or peripherals assist in the conditioning of the electric current. It also aids in subjecting the electrical current to a predetermined, parameter-driven resistance level as the electrical current passes through the substance or solution 15.

Electronic control system 17 is preferably configured to manipulate the voltage fed to electrodes 12. In the preferred embodiment, the method of spark gapping described above with one or more external capacitors, in communication with control system 17, manipulates the voltage of the electrical current introduced into resistance system 10, for example monitored by a volt meter 18 (see FIG. 4). Manipulating the voltage aids in the conditioning of the electric current to subject it to the desired resistance levels to affect the substance or solution 15 as the current passes through.

Figure 2:
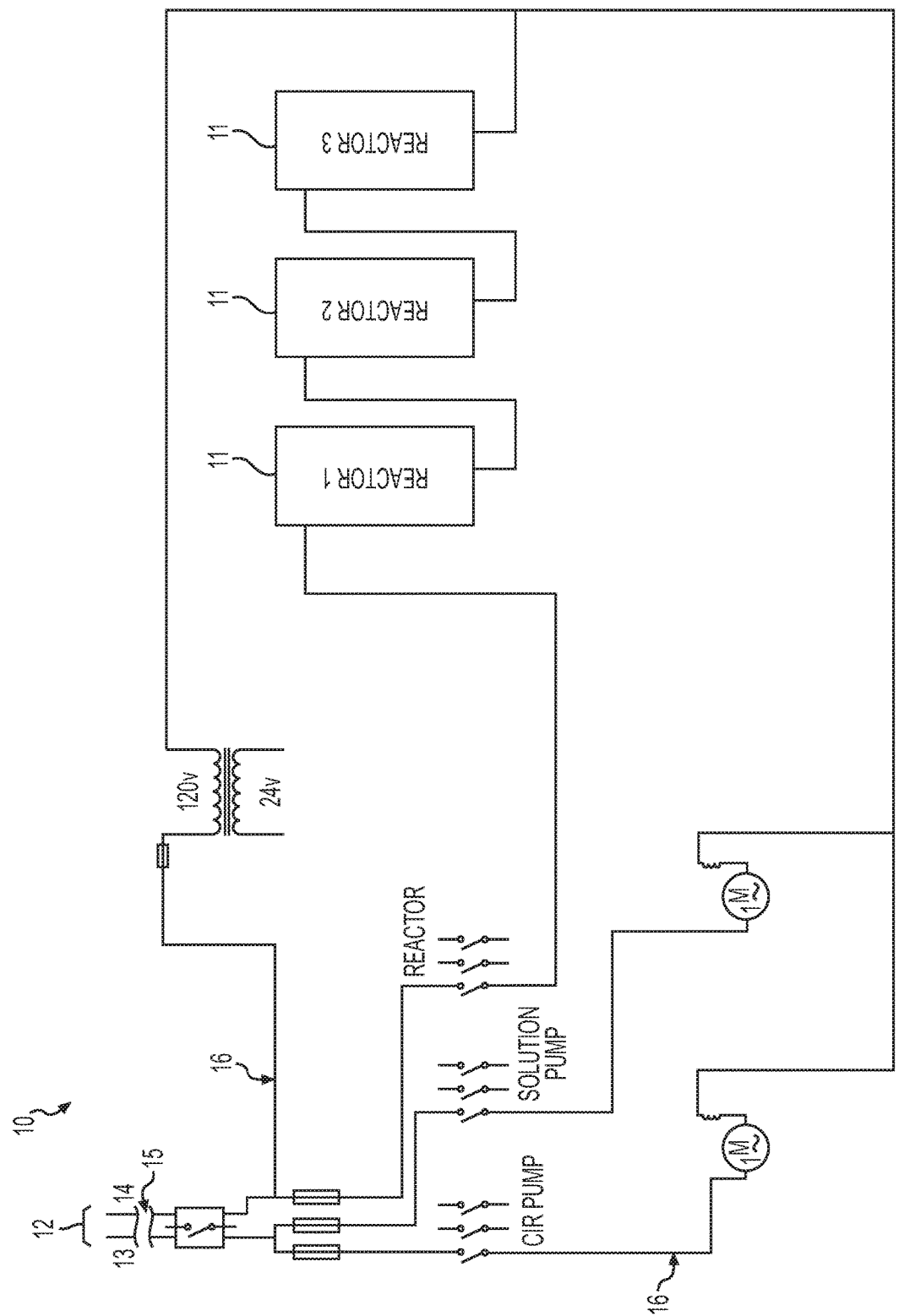
FIG. 2 is a schematic illustration of the wiring of multiple reactors.
Figure 3:
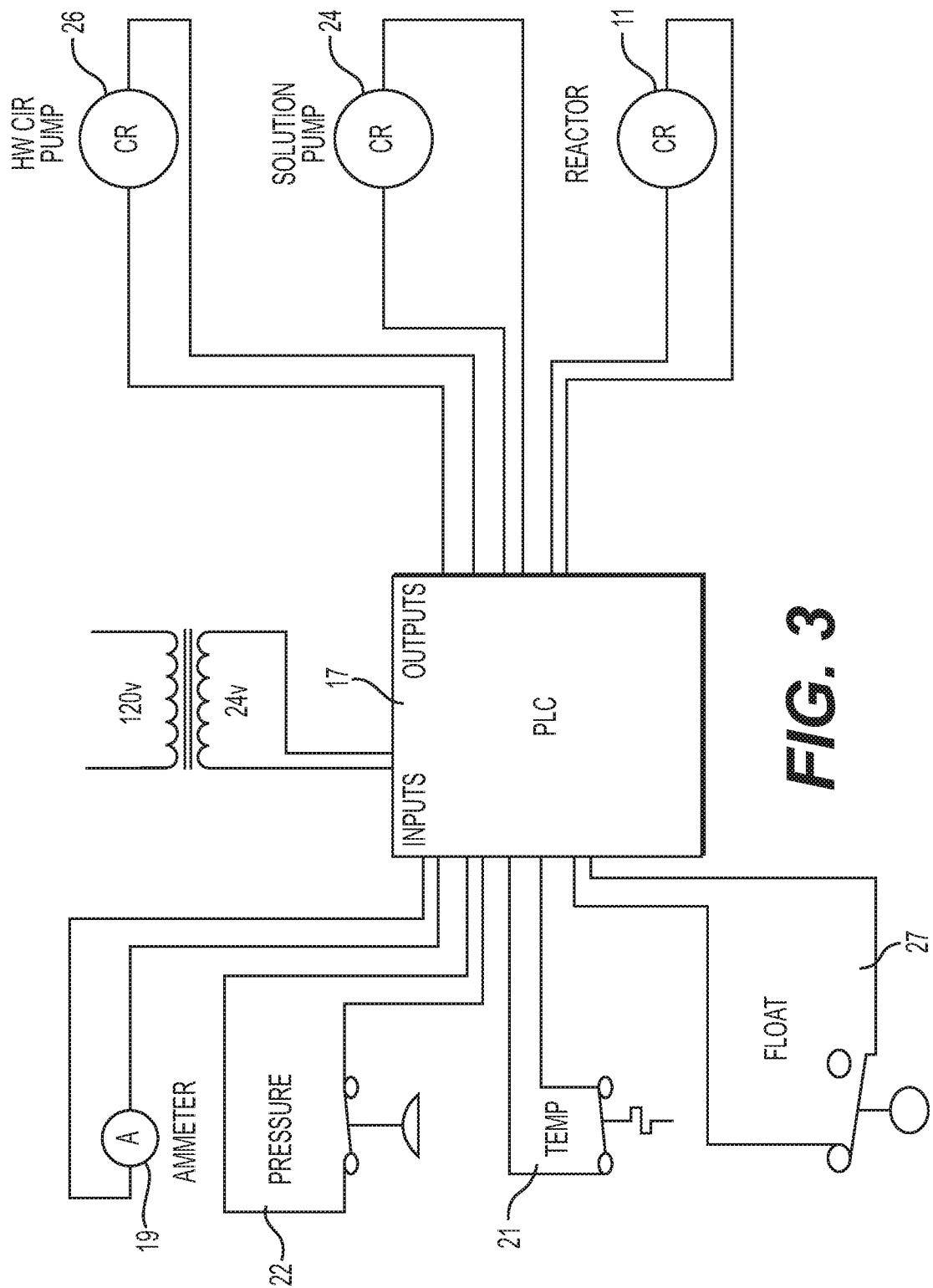
FIG. 3 is a schematic illustration of the programmable logic controller.
Figure 4:
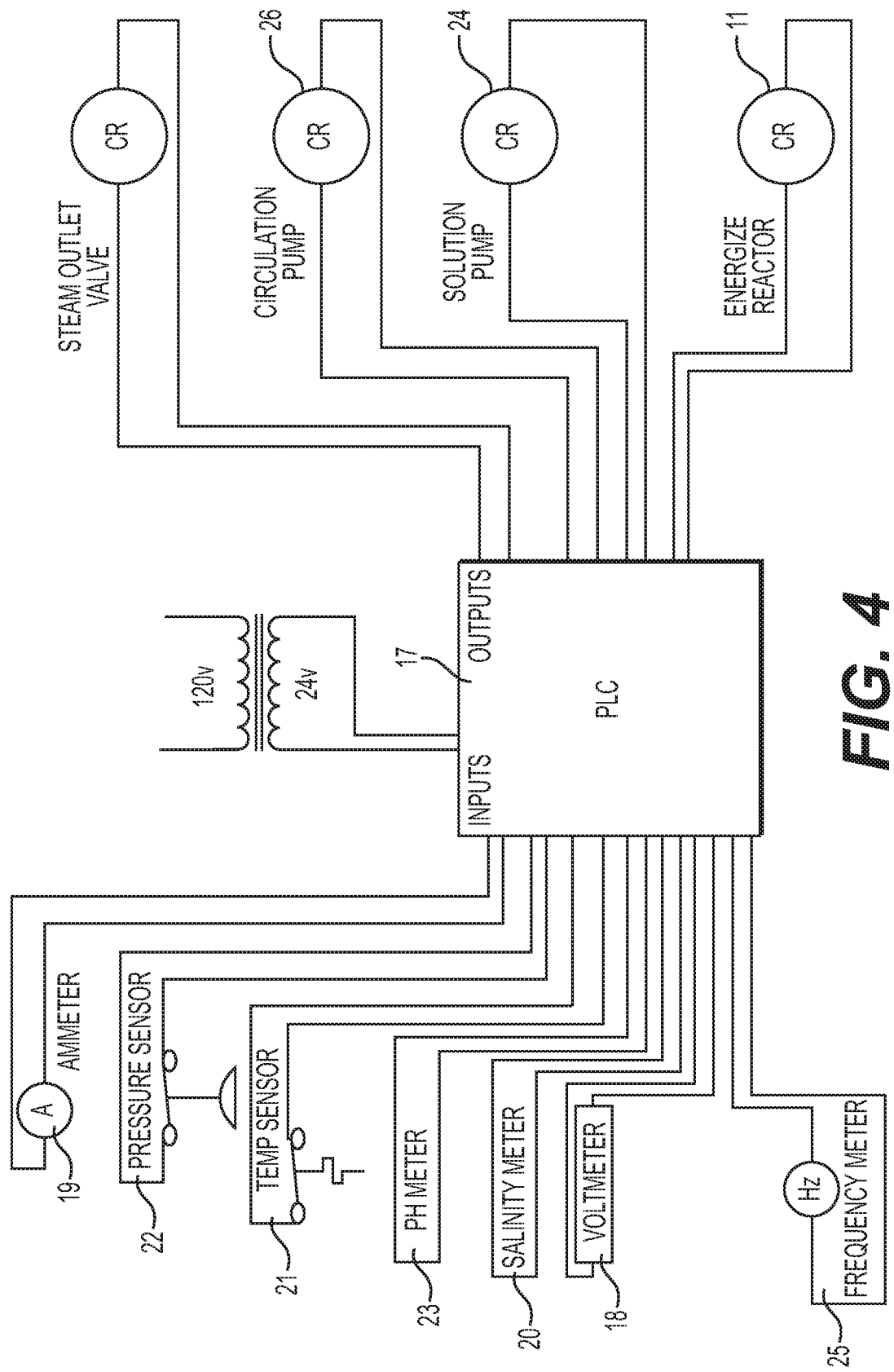
FIG. 4 is a schematic illustration of the programmable logic controller.
Figure 5:
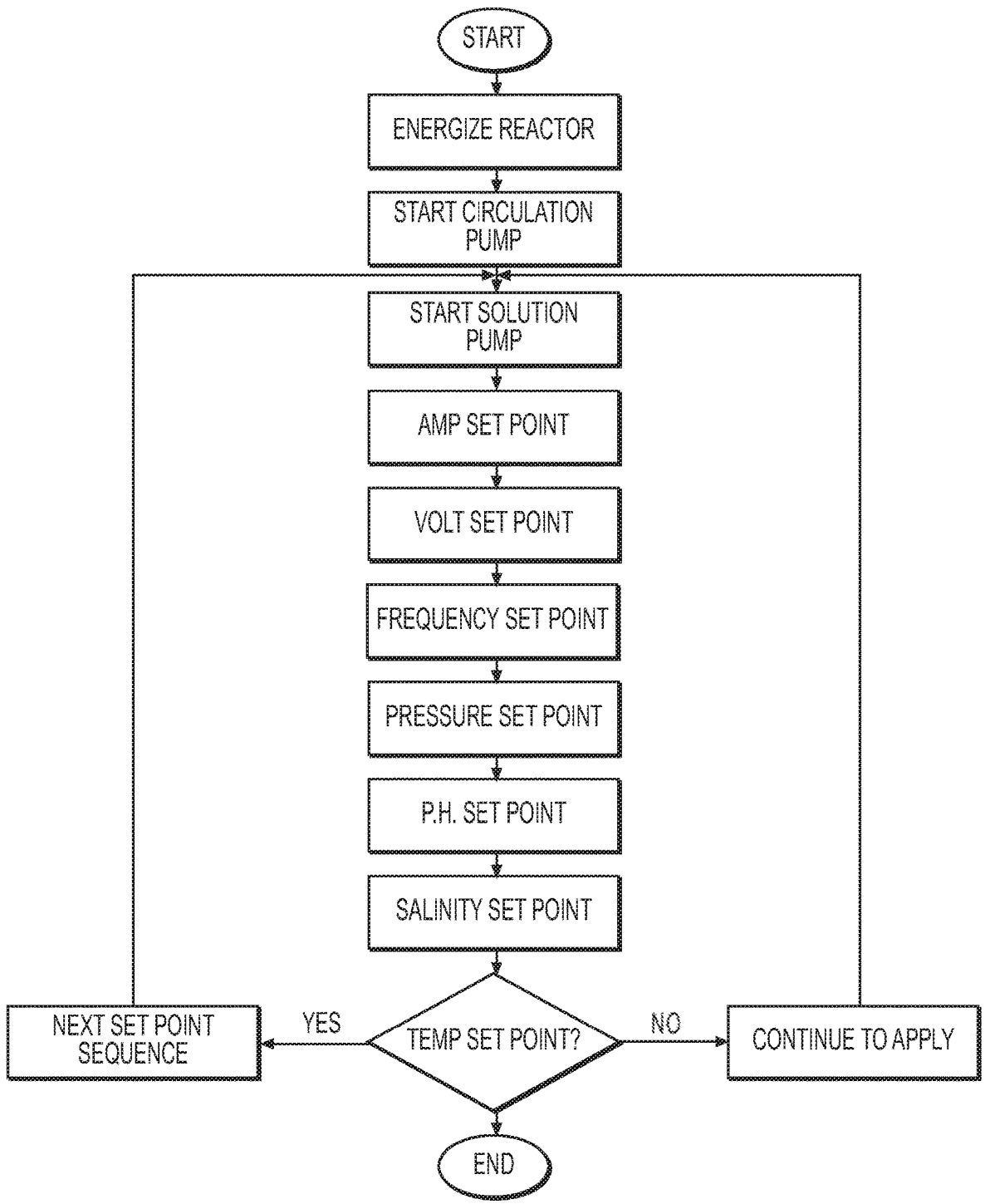
FIG. 5 is a flowchart demonstrating activation and operating of the present invention.

Electronic control system 17 is also preferably configured to manipulate the amperes fed to the electrodes 12. The manipulation of the amperage of an electrical current is a current conditioning aspect of the present method. By changing the amperage one can attain a desired level of electrical current to be imparted into system 10 at a higher or lower level. This causes more or less power to be used. Changing amperage permits a desired level in a longer or shorter amount of time, as well as permitting system 10 to operate more efficiently. This causes consumption of more or less power. FIG. 2 illustrates the power enters one reactor 11 and leaves to feed another. By placing an ammeter 19 at each of these locations changes in current from reactor to reactor can be monitored. The manipulation of amps assist in the conditioning of the electric current to subject it to the desired resistance levels to effect the median as the current passes through. In one embodiment, the amps are measured by an ammeter 19 as indicated in FIGS. 3 and 4.

The electronic control system 17 may also be utilized in conditioning the resistance properties of substance or solution 15 as contemplated for use in an electrolysis method. By manipulating substance or solution 15 using one or more of the following steps the resistance measurements of substance or solution 15 may be altered. The first of these steps is to manipulate the salinity of substance or solution 15. In doing so the resistance of substance or solution 15 may be increased or decreased. An example of this is to decrease the salinity of water to increase its resistive properties to heat the water in slower yet more efficient manner (i.e. requiring less energy to heat, but over a greater period of time). In contrast, if you wanted to heat it faster you could increase the salinity to increase the amps of the electrical current passing through the substance or solution 15. The manipulation of salinity aids in the conditioning of the resistance of substance or solution 15 to subject it to the conditioned current to affect the substance as the current passes through. In one embodiment, salinity is measured with a salinity meter 20 as indicated in FIG. 4.

The electronic control system 17 may further be utilized to manipulate the temperature of substance or solution 15. By balancing the heat buildup in substance or solution 15 in the case of an electrolysis to either increase or decrease conductivity. Manipulating the temperature assists in the conditioning of the resistance of a substance or solution to subject it to the conditioned current to affect the substance as the current passes through. In one embodiment, temperature is measured via a temperature sensor 21 as shown in FIG. 4.

The manipulation of frequency is a preferred step in the instant method. The manipulation of the frequency of the current is a current conditioning aspect of the preferred method. As the resistance level rises or falls, the frequency can change. Increasing or decreasing the pressure within the reactor 11 impacts the conductive properties of the substances or solutions being electrolyzed and also potentially alters the frequency of the electrical current. In one embodiment, the frequency of the electrical current is manipulated and measured by the control logic 17 and a frequency meter 25 as shown in FIG. 4. This change can be offset by using an external oscillator to maintain a specific, predetermined parameter.

Preferred system control 17 is also configured to manipulate atmospheric pressure within reactor(s) 11. Atmospheric pressure impacts both electrical current conditioning and resistance encountered by the electrical current. Increasing or decreasing the pressure within the reactor 11 impacts the conductive properties of the substances being electrolyzed also potentially alters the frequency of the electrical current. In one embodiment, the frequency of the electrical current is measured by a frequency meter 25 as shown in FIG. 4. The manipulation of atmospheric pressure assist in the conditioning of the resistance of a substance to subject it to the conditioned current to affect substance or solution 15 as the current passes through. For example, as the resistance level rises or falls, or as atmospheric pressure is applied or released the frequency can change. This change can be offset by using an external oscillator to maintain a specific, predetermined parameter. Additionally or in the alternative, decompressing substance or solution 15 increase the atmospheric pressure within the reactor(s) 11, resulting in increased pressure experienced by accessories such as a turbine (not shown). By decompressing the atmospheric pressure exerted on substance or solution 15, the decompressing effect on the fluid causes it to expand thereby creating force. This force can be added to steam pressure to increase the efficiency of the turbine. In one or more embodiments, pressure may be measured using a pressure sensor 22 as demonstrated in FIG. 4.

System control 17 may further be configured to manipulate the pH defined by substance or solution 15 within reactor 11. The conductivity of a solution depends on the concentration of all the ions present in substance or solution 15: the greater the concentration, the greater the conductivity. The manipulation of pH by adding substance(s) and/or solution(s) to substance or solution 15 that change the balance of cations to anions will provide another method of controlling the resistance of substance or solution 15. This manipulation assist in the conditioning of the electric current to subject it to the desired resistance levels to effect the substance as the current passes through. An embodiment of the invention is configured to measure pH by using pH meter 23 as illustrated in FIG. 4.

In an embodiment, solution pump 24 may be responsible for adding one or more solutions as needed to the reaction to keep substance or solution 15 within the predetermined or determined parameters as dictated by system control 17. In an embodiment, circulation pump 26 may be used to circulate substance or solution 15 inside the one or more reactors 11, preferably as dictated by system control 17. In an embodiment, float switch 27 may be utilized to inform system control 17 when the level of substance or solution 15 within the one or more reactors 11 is getting low, a potentially if additional substance or solution 15 need be added to the reaction.

The illustrations and examples provided herein are for explanatory purposes and are not intended to limit the scope of the appended claims.

What is claimed is:

1. A resistance method for conditioning an electric current and subjecting the electric current to manipulated resistance levels to cause an effect on a substance or solution as the conditioned electric current passes therethrough, the resistance method comprising
    providing a computer program embodied in an electronic control system a in communication with a system, the system including a number of cathode or cathodes and anode or anodes defining an orientation to form a spark gap therebetween, and the substance or solution conditioning the electric current to allow an electric spark to pass through the spark gap at a manipulated resistance level, the computer program configured to measure and manipulate a plurality of variables defined by an environment within the system,
    conditioning an electrical current to define desired current levels that effect the substance or solution as the electrical current passes therethrough,
    conditioning the substance or solution to define desired resistance levels that effect the electrical current as the electrical current passes therethrough,
    configuring the computer program to monitor the plurality of variables, and
    configuring the computer program to increase or decrease an electrical resistance encountered by the electrical current within the system by manipulating the plurality of variables by at least a solution pump.

2. The method of claim 1, wherein the computer program is further configured to measure and manipulate the plurality of variables defined by the environment within the system simultaneously.

3. The method of claim 1 further comprising conditioning the electrical current via changes in the plurality of variables defined by the electrical current as the electrical current passes through the substance or solution, said plurality of variables selected from a group consisting of voltage, amperage, and frequency.

4. The method of claim 1 further comprising conditioning the substance or solution via changes in the plurality of variables defined by the substance or solution as the electrical current passes therethrough, said plurality of variables selected from a group consisting of temperature, atmospheric pressure, salinity, and pH.

5. The method of claim 1 wherein the system includes one or more reactors, each reactor including the number of cathode or cathodes and anode or anodes defining the orientation to form the spark gap therebetween, and the substance or solution conditioning the electric current to allow an electric spark to pass through the spark gap at a manipulated resistance level.

6. The method of claim 5 further comprising wiring, said wiring connecting the electronic control system to the one or more reactors.

7. The method of claim 6, wherein the one or more reactors are wired in series.

8. A method of conditioning an electric current and subjecting the electric current to manipulated resistance levels to cause an effect on a substance or solution as the conditioned electric current passes therethrough comprising:

providing a system further comprising:
- a computer program embodied in an electronic control system in communication with one or more reactors, each reactor including a number of cathode or cathodes and anode or anodes defining an orientation to form a spark gap therebetween, and the substance or solution conditioning the electric current to allow an electric spark to pass through the spark gap at a manipulated resistance level,
- configuring the computer program to monitor a plurality of variables defined by an environment within the one or more reactors, and
- configuring the computer program to increase or decrease an electrical resistance to the manipulated resistance level encountered by the electrical current within the one or more reactors by at least a solution pump.

9. The method of claim 8, wherein the computer program is further configured to measure and monitor the plurality of variables defined by the environment within the one or more reactors simultaneously.

10. The method of claim 8 further comprising conditioning the electrical current via changes in the plurality of variables defined by the electrical current as the electrical current passes through the substance or solution, said plurality of variables selected from a group consisting of voltage, amperage, and frequency.

11. The method of claim 8 further comprising conditioning the substance or solution via changes in the plurality of variables defined by the substance or solution as the electrical current passes therethrough, said plurality of variables selected from a group consisting of temperature, atmospheric pressure, salinity, and pH.

12. The method of claim 8 further comprising wiring, said wiring connecting the electronic control system to the one or more reactors.

13. The method of claim 12, wherein the one or more rectors are wired in series.

* * * * *